(12) United States Patent
Hua

(10) Patent No.: US 8,971,231 B2
(45) Date of Patent: Mar. 3, 2015

(54) SYSTEMS AND METHODS FOR MOBILE COMMUNICATIONS

(75) Inventor: Kien A. Hua, Longwood, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 782 days.

(21) Appl. No.: 12/192,035

(22) Filed: Aug. 14, 2008

(65) Prior Publication Data

US 2009/0046622 A1    Feb. 19, 2009

Related U.S. Application Data

(60) Provisional application No. 60/955,747, filed on Aug. 14, 2007.

(51) Int. Cl.
*H04B 7/14*    (2006.01)
*H04W 40/02*    (2009.01)
*H04L 12/721*    (2013.01)
*H04W 40/32*    (2009.01)

(52) U.S. Cl.
CPC .............. *H04W 40/02* (2013.01); *H04L 45/26* (2013.01); *H04W 40/32* (2013.01)
USPC .......................................... 370/315; 370/401

(58) Field of Classification Search
CPC ..... H04L 45/586; H04L 45/22; H04W 80/04; H04W 40/02
See application file for complete search history.

(56) References Cited

U.S. PATENT DOCUMENTS

| | | | |
|---|---|---|---|
| 5,930,714 A * | 7/1999 | Abu-Amara et al. ......... | 455/442 |
| 6,535,498 B1 * | 3/2003 | Larsson et al. ................ | 370/338 |
| 6,556,547 B1 * | 4/2003 | Srikanth et al. ............... | 370/317 |
| 6,690,657 B1 * | 2/2004 | Lau et al. ....................... | 370/315 |
| 6,879,574 B2 * | 4/2005 | Naghian et al. ............... | 370/338 |
| 6,885,667 B1 * | 4/2005 | Wilson .......................... | 370/392 |
| 6,885,847 B1 * | 4/2005 | Lumelsky ..................... | 455/41.2 |
| 6,920,171 B2 * | 7/2005 | Souissi et al. ................. | 375/133 |
| 7,016,336 B2 * | 3/2006 | Sorensen ...................... | 370/351 |
| 7,126,937 B2 * | 10/2006 | Crosbie et al. ................ | 370/350 |
| 7,242,677 B2 * | 7/2007 | Hong ............................ | 370/346 |
| 7,257,106 B2 * | 8/2007 | Chen et al. .................... | 370/338 |
| 7,957,355 B1 * | 6/2011 | Heiferling et al. ............ | 370/338 |
| 8,238,288 B2 * | 8/2012 | Ahn ............................... | 370/328 |
| 8,254,350 B2 * | 8/2012 | Ban et al. ...................... | 370/338 |
| 2002/0039357 A1 * | 4/2002 | Lipasti et al. ................. | 370/338 |
| 2002/0080752 A1 * | 6/2002 | Johansson et al. ............ | 370/338 |
| 2004/0185780 A1 * | 9/2004 | Coupechoux et al. .......... | 455/62 |
| 2007/0147372 A1 * | 6/2007 | Liu et al. ....................... | 370/390 |
| 2007/0297374 A1 * | 12/2007 | El-Damhougy ............... | 370/338 |
| 2008/0112325 A1 * | 5/2008 | Sivakumar et al. ........... | 370/238 |
| 2008/0310376 A1 * | 12/2008 | Ban et al. ...................... | 370/338 |
| 2009/0085769 A1 * | 4/2009 | Thubert et al. ........... | 340/870.07 |
| 2009/0086949 A1 * | 4/2009 | Caspi et al. ............... | 379/202.01 |
| 2009/0109891 A1 * | 4/2009 | Fonseca et al. ............... | 370/315 |
| 2009/0157358 A1 * | 6/2009 | Kim .............................. | 702/185 |

* cited by examiner

*Primary Examiner* — Marsha D Banks Harold
*Assistant Examiner* — Hooman Houshmand
(74) *Attorney, Agent, or Firm* — Thomas | Horstemeyer, LLP

(57) ABSTRACT

Messages are delivered in a mobile network by creating a communication route between a source node and a destination node comprised of virtual routers, each virtual router being fixed to a particular geographical area and including a plurality of mobile nodes, each of the mobile nodes being available to forward a data packet on behalf of a virtual router, and each mobile node upon receiving a data packet sent over the communication route monitoring for forwarding of the data packet by another mobile node and, if such forwarding is not detected, the mobile node forwarding the data packet.

26 Claims, 7 Drawing Sheets

SYSTEMS AND METHODS FOR MOBILE COMMUNICATIONS

CROSS-REFERENCE TO RELATED APPLICATION

This application claims priority to U.S. provisional application entitled "Systems and Methods for Mobile Communications," having Ser. No. 60/955,747 and filed Aug. 14, 2007, which is entirely incorporated herein by reference.

BACKGROUND

There are two primary variations of mobile wireless networks: infrastructure mobile networks and infrastructureless mobile networks. The latter are also known as mobile ad-hoc networks (MANETs). MANETs have no fixed infrastructure. Instead, mobile nodes function as relay points or routers, which discover and maintain communication connections between source nodes and destination nodes for various data transmission sessions. In other words, a MANET is a self-organizing, multi-hop wireless network in which potentially all nodes within a given geographical area participate in the routing and data forwarding process.

Maintaining communication links of an established communication path that extends between source and destination nodes is a significant challenge in MANETs. In particular, due to movement of the mobile nodes between the source and destination nodes, which typically cannot be controlled, such communication links are often broken. Although a new communication route can be established when a break in the communication path occurs, repeatedly reestablishing new routes incurs delay and substantial overhead.

BRIEF DESCRIPTION OF THE DRAWINGS

The disclosed systems and methods can be better understood with reference to the following drawings. The components in the drawings are not necessarily to scale.

DETAILED DESCRIPTION

As described above, it can be difficult to maintain communication links of an established communication path in a mobile ad-hoc network (MANET) due to movement of the mobile nodes. As described in the following, that difficultly can be significantly reduced by establishing and using virtual routers. As used herein, the term "virtual router" describes a dynamically-created logical router that is associated with a particular geographic location. In some embodiments, the virtual router comprises one or more physical nodes (e.g., mobile wireless devices) currently within a geographical region served by the virtual router. Once within the geographical region of the virtual router, those physical nodes can take turns in forwarding data packets to be transmitted along the communication path. Although the physical nodes may move, the virtual routers do not since they are defined by the geographical region. Because of that stability, the virtual router's communication links are much more robust than the routers of conventional systems.

Figure 1:
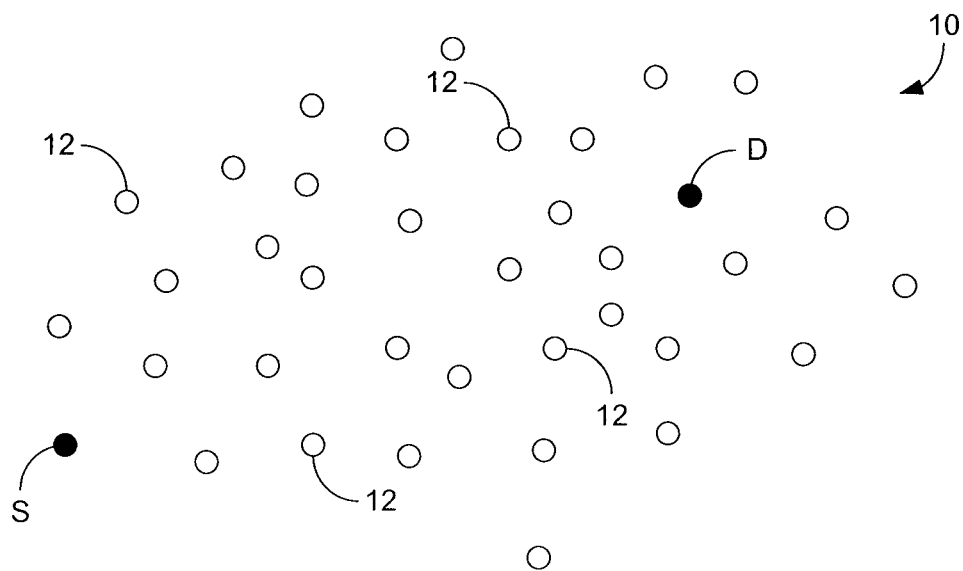
FIG. 1 is a block diagram of a wireless network in which virtual routers can be established.

Referring now to the figures, in which like references identify corresponding elements, FIG. 1 illustrates an example wireless network 10. The wireless network 10 comprises a plurality of mobile nodes 12 that are physically positioned between a source node S and a destination node D, which respectively comprise the source and the destination of a wireless communication. Because the mobile nodes 12 are located between the source node S and the destination node D, the mobile nodes are potentially available for use in delivering messages between the source node and the destination node. Each of the mobile nodes 12 comprises a mobile terminal. Example mobile terminals include mobile telephones, notebook computers, personal digital assistants (PDAs), and any other mobile device that is capable of sending and receiving mobile communications. The source node S and the destination node D can also comprise mobile terminals and therefore can have configurations similar to that of the mobile nodes 12. Alternatively, the source node S and the destination node D can comprise stationary terminals.

Figure 2:
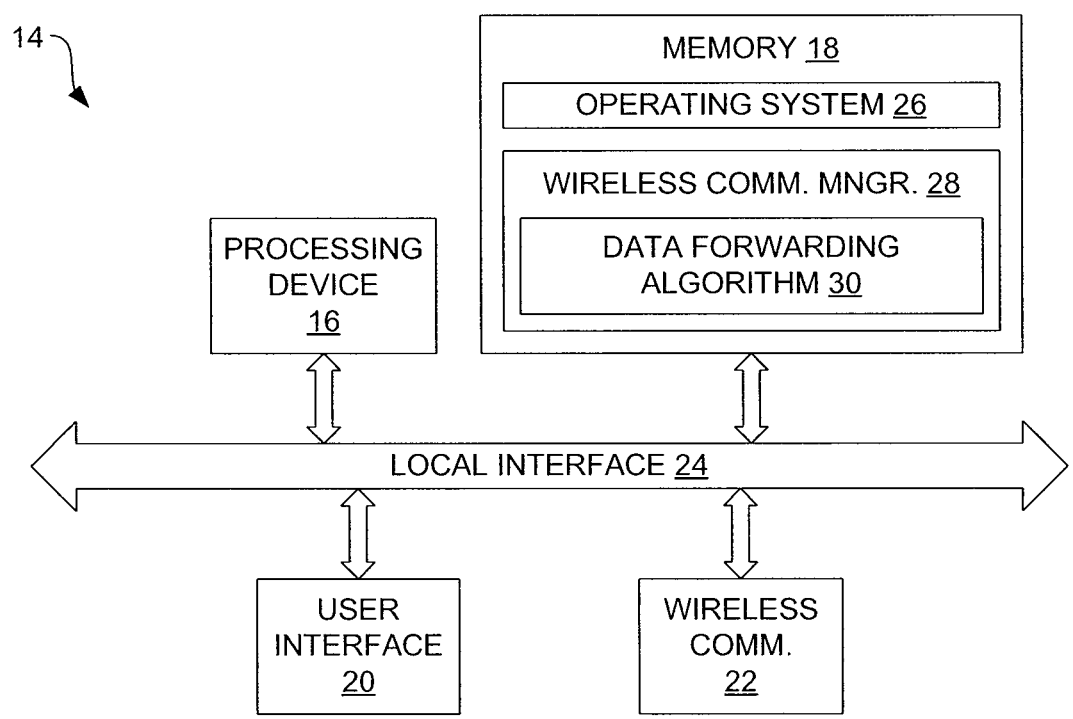
FIG. 2 is a block diagram illustrating an embodiment of architecture for a wireless node that can be used in the wireless network of FIG. 1.

FIG. 2 illustrates an example architecture for a wireless node 14 that can be used in the wireless network 10 of FIG. 1. More particularly, the node 14 can comprise one of the mobile nodes 12 or one of the source node S and the destination node D. As indicated in FIG. 2, the node 14 generally comprises a processing device 16, memory 18, a user interface 20, and a wireless communication device 22, each of which is connected to a local interface 24.

The processing device 16 can comprise a central processor and/or one or more application specific integrated circuits (ASICs) that control overall operation of the wireless node 14. The memory 18 includes any one of or a combination of volatile memory elements (e.g., RAM) and nonvolatile memory elements (e.g., ROM) that store code that can be executed by the processing device 16.

The user interface 20 comprises the components with which a user interacts with the wireless node 14, such as a display and one or more buttons or keys. The wireless communication device 22 is adapted to facilitate wireless communications with other nodes and can comprise a wireless (e.g., radio frequency (RF)) transceiver.

The memory 18 comprises various programs (i.e., logic) including an operating system 26 and a wireless communications manager 28. The operating system 26 controls the overall operation of the wireless node 14 and the execution of other programs. The wireless communications manager 28 is a program that controls wireless communications for the wireless node 14 and, therefore, controls the node's participation in ad-hoc networks. Accordingly, the wireless communications manager 28 can participate in the establishment of a communication route between a source node and a destination node and can control whether or not the wireless node 14 will forward received data packets associated with communications between the source node and the destination node. In some embodiments, the determination as to whether or not to forward a data packet is made relative to a data forwarding algorithm 30, an example of which being described in the relation to FIGS. 8A and 8B.

Figure 3:
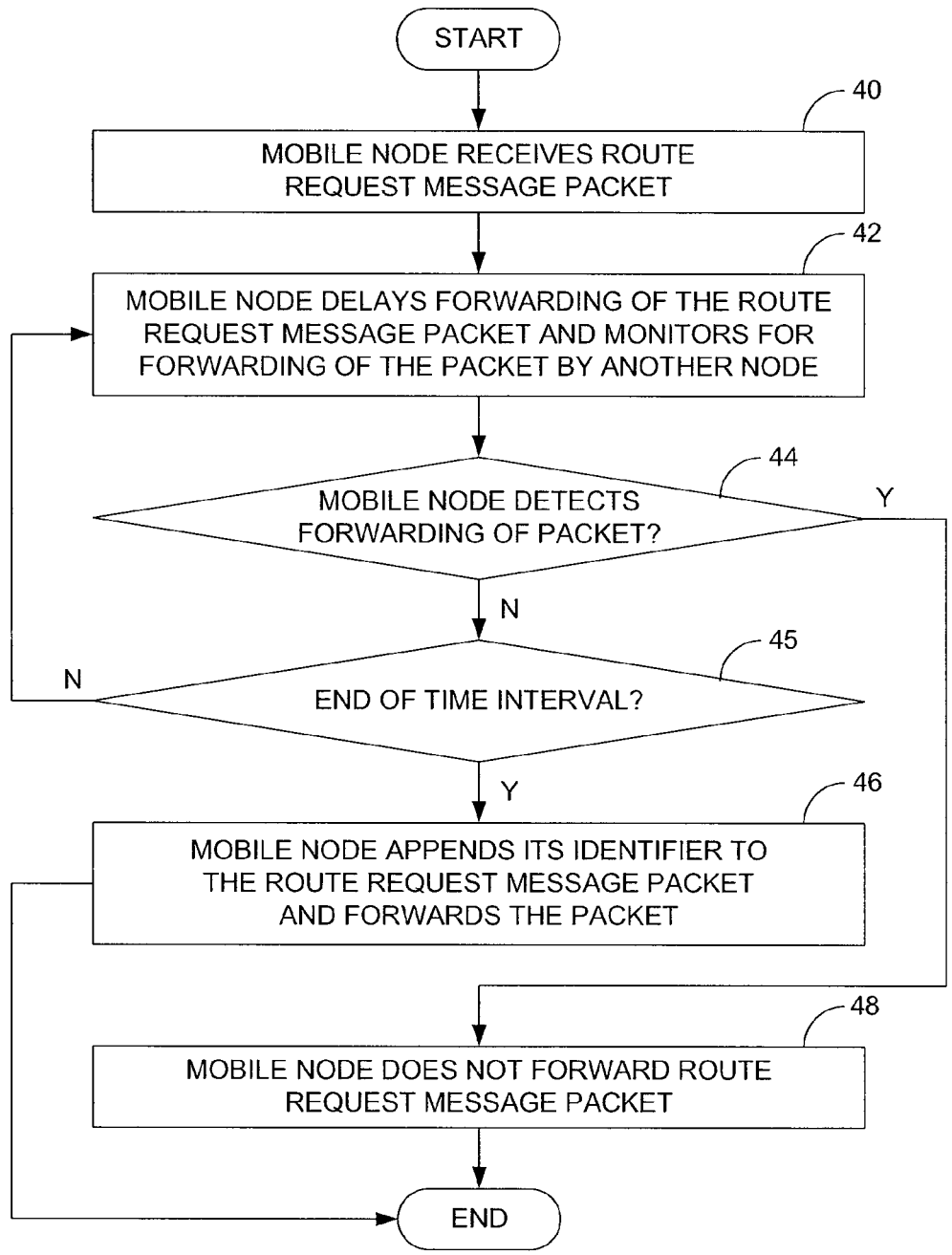
FIG. 3 is a flow diagram of an embodiment of operation of a mobile node after receiving a route request message.

As described above, virtual routers can be established to form more reliable communication paths. To establish a communication path or route, a route request is performed, followed by a route reply. Once the route reply has been received, a communication route comprising one or more virtual routers has been established that can be used to transmit data. FIG. 3 illustrates an example of operation of a mobile node after receiving a route request.

When a source node needs to send a data packet to a destination node and has not yet established a communication route, the source node initiates a route request. More particularly, the source node broadcasts a route request message packet that contains the source node's identification (ID). When the route request message packet is broadcast, nearby participating mobile nodes receive the packet, as indicated in block 40 of FIG. 3. Although each mobile node that receives the route request message packet could simply forward (i.e., broadcast) the packet, a probabilistic delay technique can instead be employed to avoid flooding the network with route request messages. To that end, each mobile node that receives the route request message packet delays forwarding and monitors for forwarding of the packet by another node, as indicated in block 42. The mobile node can delay the packet for a predetermined or random time interval. With reference to decision block 44, if the mobile node detects forwarding of the route request message packet by another node, then the mobile node does not forward the message, as indicated in block 48, given that such forwarding is not necessary. Referring to decision block 45, if no forwarding is detected but the time interval has not yet ended, the mobile node continues to delay and monitor (block 42). If, on the other hand, forwarding of the route request message packet is not detected within the time interval, flow continues to block 46 at which the mobile node appends its own ID to the packet and forwards (i.e., broadcasts) the packet.

Figure 4:
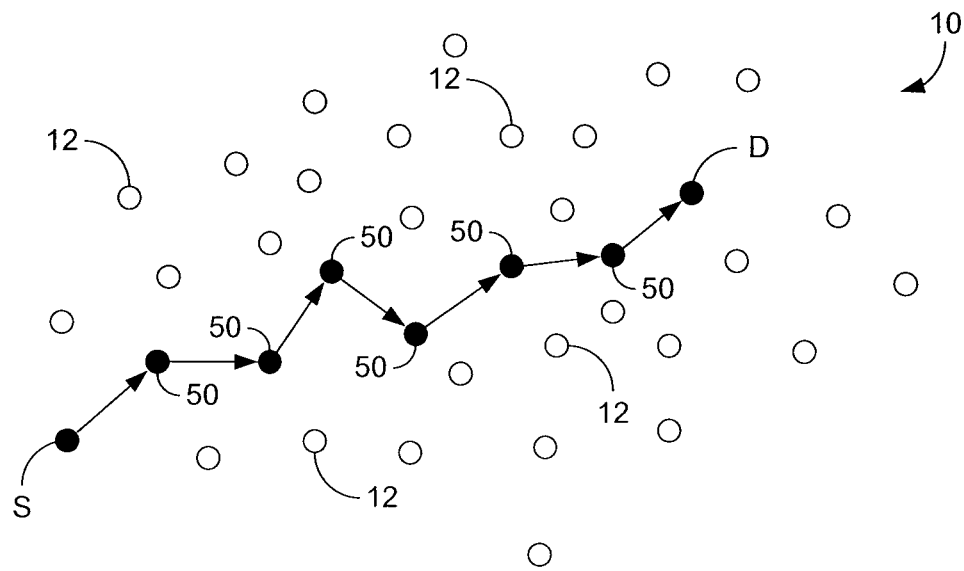
FIG. 4 is a block diagram that illustrates an embodiment of communication of a route request in the wireless network of FIG. 1.

The above process is performed by each mobile node in the wireless network that receives the route request message packet so that the route request message packet traverses the network and ultimately arrives at the destination node. Such traversal is depicted by arrows in FIG. 4, which illustrates the route request message packet being forwarded by certain nodes 50, referred to herein as relay nodes.

Figure 5:
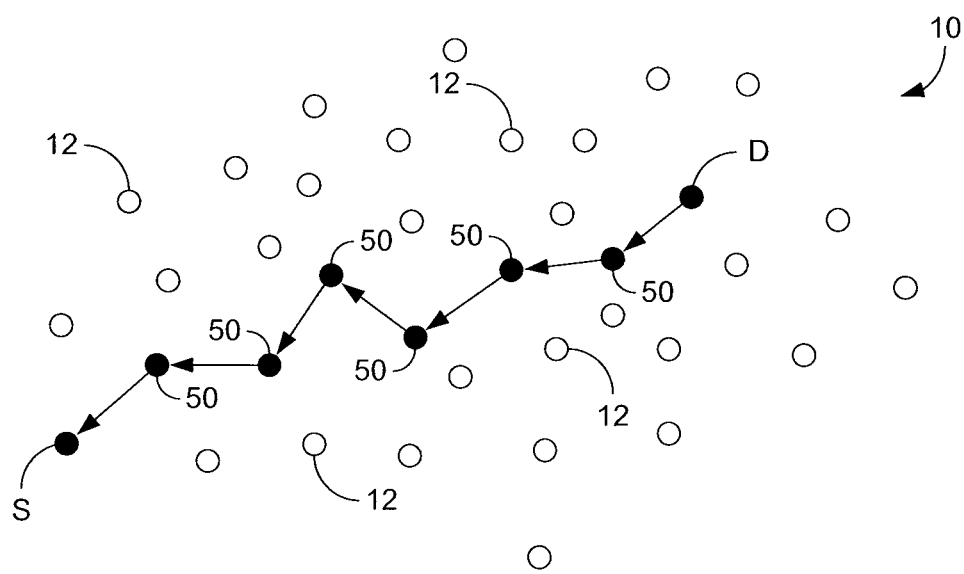
FIG. 5 is a block diagram that illustrates an embodiment of communication of a route reply in the wireless network of FIG. 1.

Once the destination node has received the route request, it initiates a route reply to establish a communication route. More particularly, the destination node broadcasts a route reply message packet. That packet can contain various information, including the destination node's ID, the source node's ID, a list of the relay nodes 50 that the route request message packet traversed, and a route ID. In some embodiments, the route ID comprises the destination node's ID concatenated with a locally-generated unique number to ensure the uniqueness of the route ID in the network. After the route reply message packet has been broadcast, it is routed by the relay nodes identified in the packet. Such routing is illustrated in FIG. 5, which depicts relay nodes 50 forwarding the packet (indicated by arrows) to the source node S.

Figure 6:
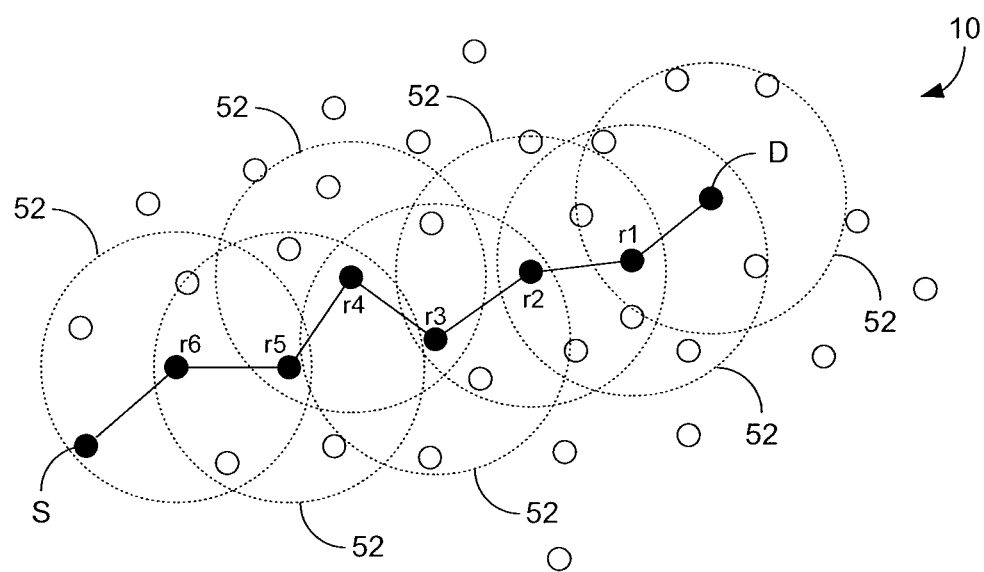
FIG. 6 is a block diagram that illustrates an embodiment of virtual routers that have been created in the wireless network of FIG. 1.

Significantly, any neighboring node that "overhears" the packet can potentially join the communication route and form part of one or more virtual routers of the route. Therefore, like the relay nodes, the overhearing nodes will be available for forwarding data packets along the route. As described below in relation to FIGS. 8A and 8B, for any mobile node in the route, including both the relay nodes and the overhearing nodes, the determination as to whether to forward a data packet is made relative to the distance-to-destination (DTD) of the node to the destination node. The DTD of a node is expressed in terms of the number of virtual hops to the destination node. FIG. 6 illustrates an example of how the DTD is determined. In FIG. 6, each relay node has been assigned a reference numeral in the range of r1-r6. In the example of FIG. 6, the DTD of relay node r1 is 1, the DTD of the relay node r2 is 2, and so forth. Each relay node uses its DTD value to update the virtual hop count field in the route reply message packet it forwards.

With further reference to FIG. 6, circles 52 identify the broadcast range of the relay nodes, and therefore the geographical extent of the virtual routers. The neighboring nodes within those circles can overhear transmissions of one or more of the relay nodes and therefore comprise the overhearing nodes. Each overhearing node can determine its own DTD as the minimum virtual hop count it has overheard for a given route reply. As an example, assume a node "n" can overhear a route reply message packet broadcast by relay nodes r1, r2, and r3, which are 1, 2, and 3 hops away from the destination node D, respectively. In such a case, the DTD of node n is 1, the lowest overheard virtual hop count.

Figure 7:
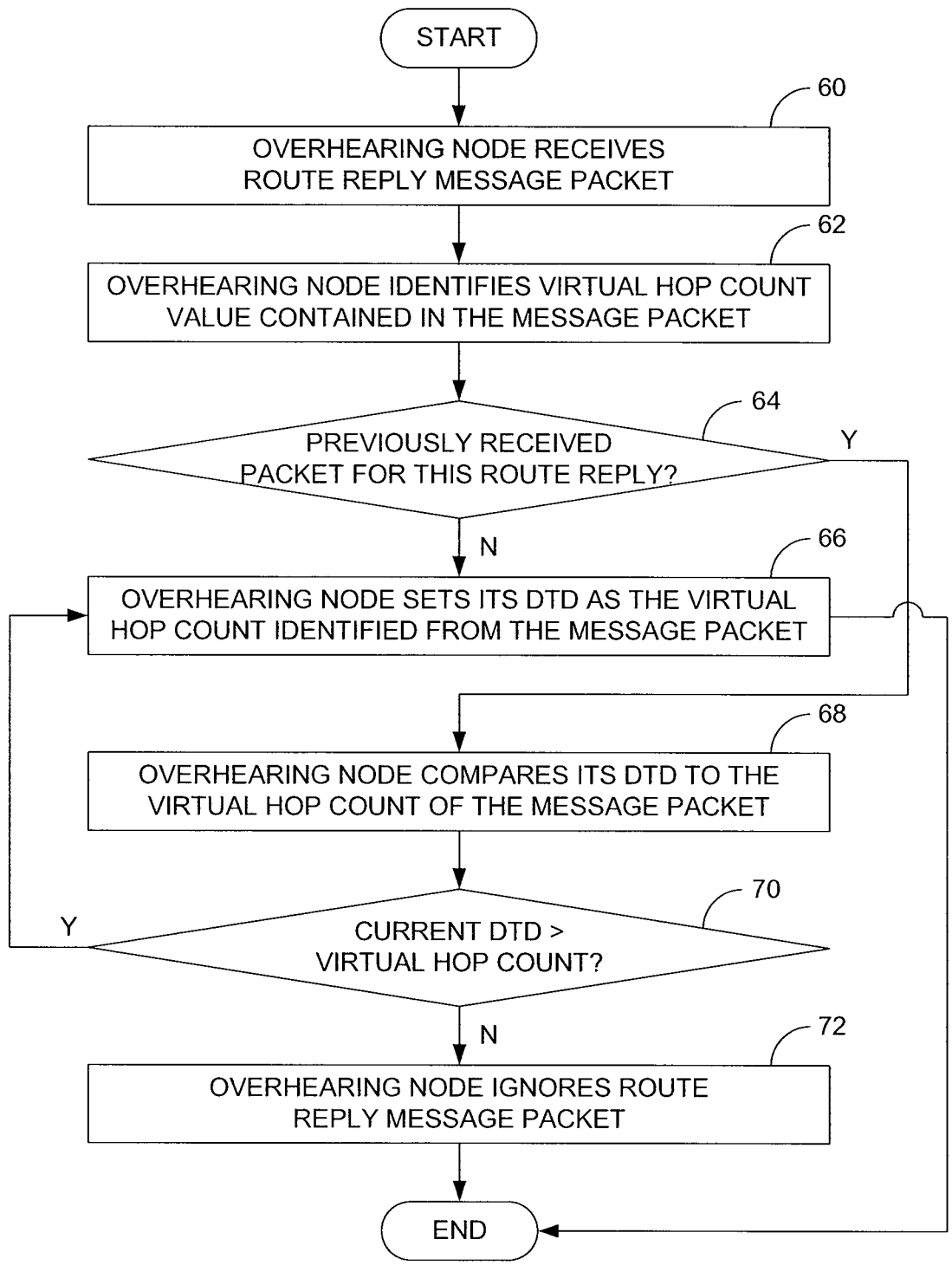
FIG. 7 is a flow diagram of an embodiment of operation of an overhearing node in determining its distance-to-destination for the purpose of participation in a virtual router.

FIG. 7 presents an example method for an overhearing node determining its DTD. The process described in that figure can be performed by the overhearing node each time a route reply message packet is received. Beginning with block 60 of FIG. 7, the overhearing node receives a route reply message packet. The overhearing node then identifies the virtual hop count value contained in the route reply message packet, as indicated in block 62. With reference to decision block 64, the overhearing node determines whether it had previously received another message packet for the route reply identified by received message packet. If not, the message packet is the first message packet received in relation to that route reply, and the overhearing node initially sets its DTD as the identified virtual hop count value, as indicated in block 66.

If the overhearing node had previously received another route reply message packet, the overhearing node is within the transmission range of more than one relay node therefore forms part of more than one virtual router. In that situation, flow continues to block 68 at which the overhearing node compares its current DTD, which was set relative to the virtual hop count of the previously-received route reply message packet, to the virtual hop count of the new packet. With reference to decision block 70, if the current DTD is greater than the virtual hop count of the new route reply message packet, that packet is from a relay node that is closer to the destination node than the relay node that sent the previously-received route reply message packet. In that situation, the overhearing node sets its DTD as the virtual hop count value identified in the new packet, as indicated in block 66. If the current DTD is not greater than the virtual hop count of the new route reply message packet, however, the overhearing node ignores the packet, as indicated in block 70.

With such operation, each virtual router will comprise neighboring nodes having the same DTD, and the virtual router will therefore be associated with a given geographical region identified by circles 52 in FIG. 6. When the route reply message packet reaches the source node S, the newly-created virtual routers, which each comprise all of the mobile nodes within a given transmission range 52, together form a complete route between the source node and the destination node D.

Once the communication route has been established in the manner described above, it can be used to transmit data packets between the source and the destination nodes. The source node can include various information in the header of the data packets it transmits over the communication route. By way of example, the source node includes each of the following in the packet header: a source node ID, the destination node ID, a packet ID, the route ID, the virtual hop count, and a list of traversed nodes. The packet ID refers to the ID the source node assigns to this data packet. The virtual hop count field is updated with the DTD of each node before the node forwards the data packet along the route. The list of traversed nodes refers to the list of nodes that has forwarded the data packet. The list is generated by each intermediate node appending its node ID to this list before forwarding the packet.

Figure 8A:
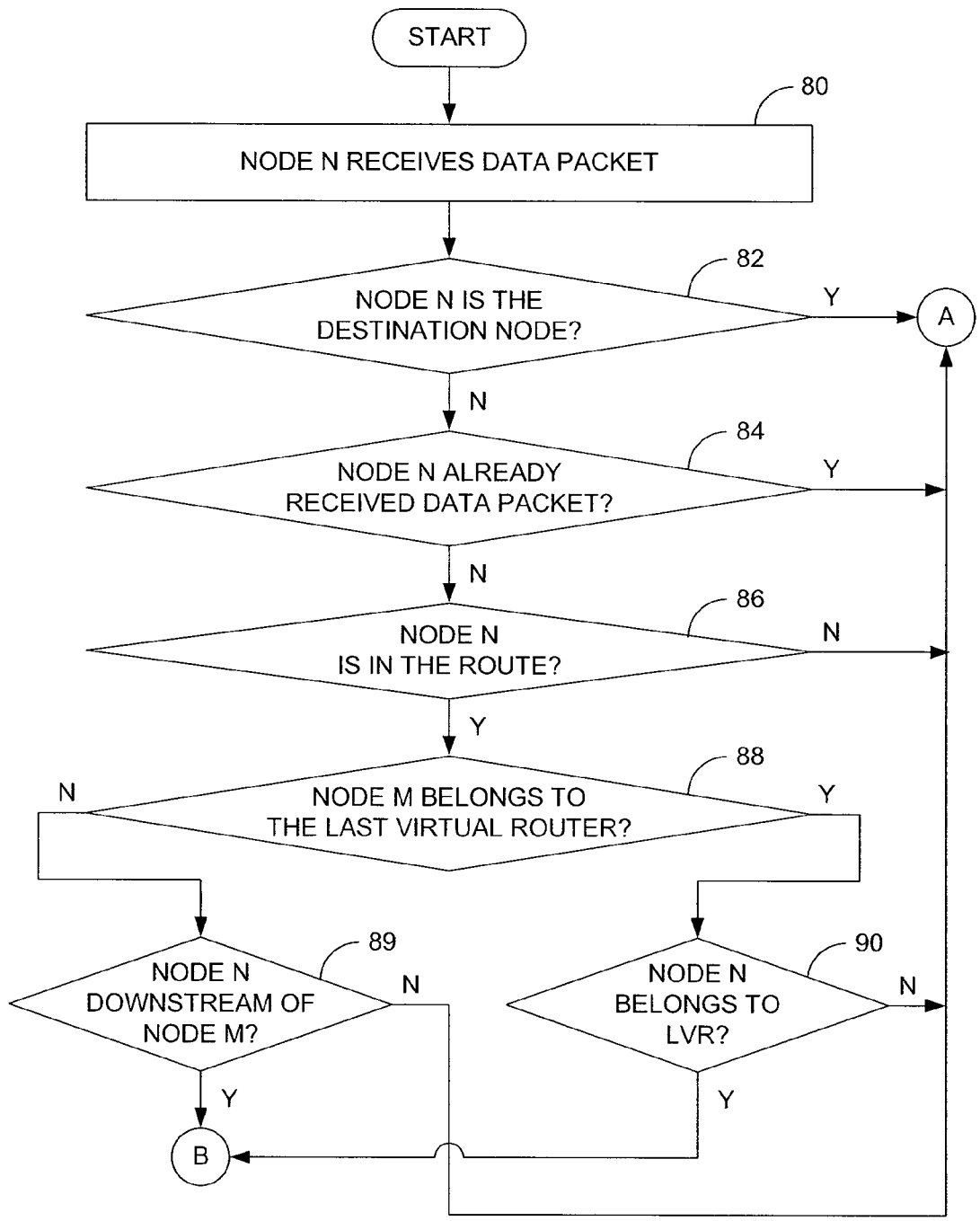
FIGS. 8A and 8B comprise a flow diagram of an embodiment of operation of a wireless node after receiving a data packet once a communication route has been established.
Figure 8B:
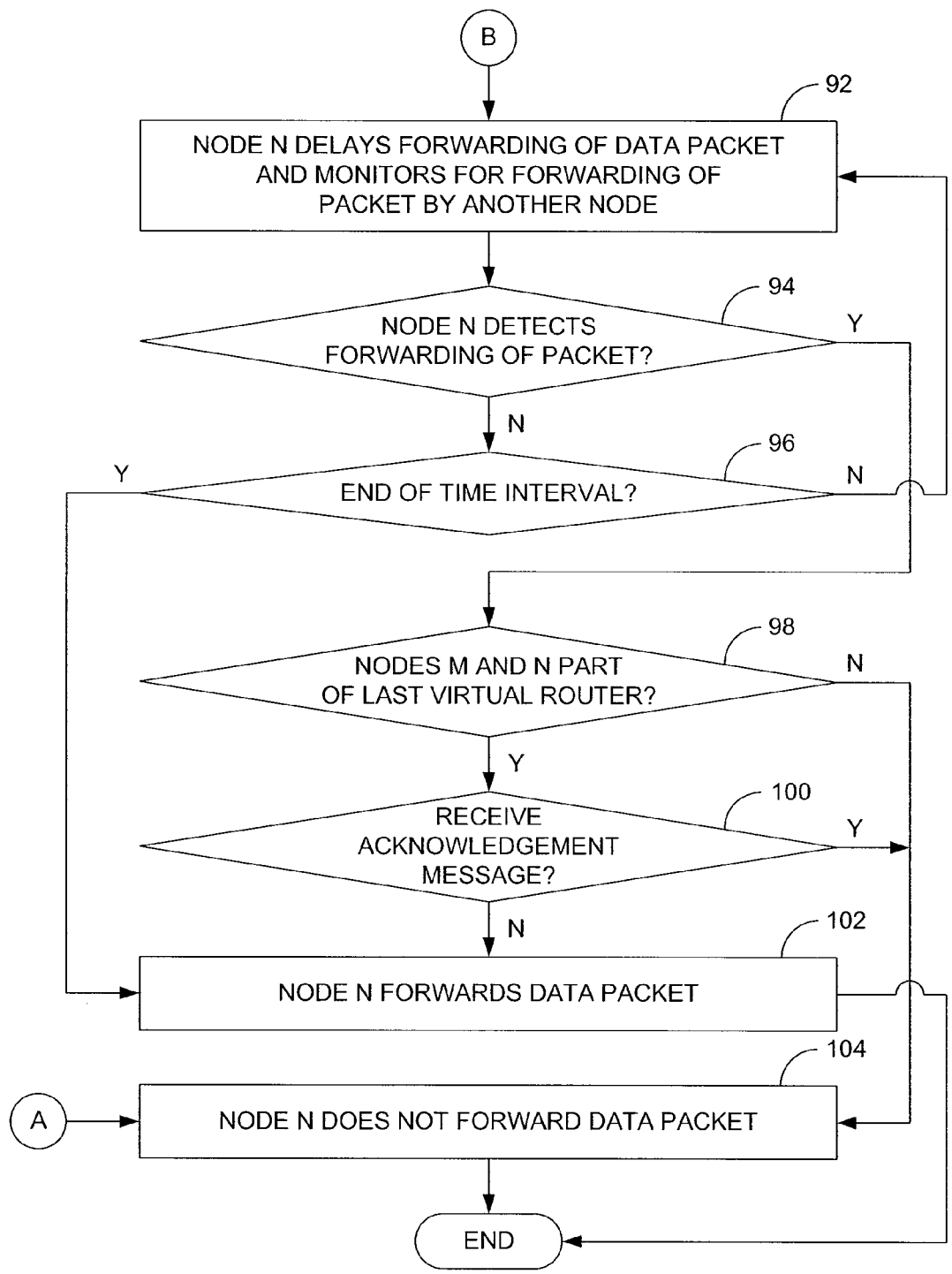

FIGS. 8A and 8B together illustrate an embodiment of a method practiced by a node n in determining whether to forward a data packet that was transmitted by and received from another node m in a wireless network, such as network 10 of FIG. 6. In some embodiments, the method of FIGS. 8A and 8B is embodied in the data forwarding algorithm 30 identified in FIG. 2.

Beginning with block 80 of FIG. 8A, node n receives a data packet. The node n can be any node within a wireless network other than the source node, and therefore can comprise the destination node or a mobile node (relay node or overhearing node) positioned between the source node and the destination node. Once the data packet has been received, the node n must determine whether or not to forward the packet. That determination is made relative to various criteria described in the following.

First, in relation to decision block 82, the action to be taken (i.e., to forward or not forward the data packet) depends upon whether the node n is the destination node. In some embodiments, the node n determines whether it is the destination node by referencing the destination node ID field of the packet header. If the node n is the destination node, the data packet has already arrived at its final destination and there is no reason to forward the packet any further. Accordingly, as indicated in block 104 of FIG. 8B, the node n does not forward the data packet. In that situation, the node n can instead broadcast an acknowledgement message to inform its neighbors that the data packet has arrived at the final destination (not shown).

Assuming that the node n is not the destination node, flow proceeds to decision block 84 of FIG. 8A, at which the action to be taken depends upon whether the node n has already received the data packet. If so, another copy of the data packet has already been processed by node n and, again, there is no need for the node n to forward the packet. Therefore, with reference to block 104 of FIG. 8B, the node n does not forward the data packet.

If the node n did not already receive the data packet, flow continues to block 86 of FIG. 8A, at which the action to be taken depends upon whether node n is in the communication route. In some embodiments, the node n determines if it is part of the route by comparing the route ID field of the data packet with all the route IDs the node has identified from the received route reply message packets. If the packet route ID matches the route ID of one of the route reply message packets, the node n is in the communication route. Periodically, each node can remove from its cache all the route IDs that have not been heard for a predetermined period of time. If the node n is not part of the route, flow again continues to block 104 of FIG. 8B and the node n does not forward the data packet. If, on the other hand, the node n is part of the route, flow continues to decision block 88 of FIG. 8A.

From this point, flow depends upon whether or not node m, i.e., the node from which node n received the data packet, belongs to the last virtual router. As used herein, the term "last virtual router" denotes the virtual router that is centered at the destination node. In some embodiments, node n determines whether node m belongs to the last virtual router by identifying node m's DTD, which is registered in the virtual hop count field of the packet header. If that value is anything but 1, node m is not part of the last virtual router. If node m does not belong to the last virtual router, flow continues to decision block 89, from which flow depends upon whether node n is downstream of node m. In some embodiments, node n determines if it is upstream or downstream of node m by comparing node n's DTD to the virtual hop count field of the packet header. If node n's DTD is greater than the virtual hop count, node n is upstream of node m and, therefore, farther from the destination node. Conversely, if node n's DTD is less than the virtual hop count, node n is downstream of node m and, therefore, closer to the destination node. If node n is not downstream of node m, node n will not forward the data packet, as indicated in block 104 of FIG. 8B. If node n is downstream, however, node n potentially will forward the data packet, and flow continues on to block 92 of FIG. 8B described below.

With reference again to decision block 88 of FIG. 8A, if node m does belong to the last virtual router, flow continues to decision block 90 at which it is determined whether node n belongs to the last virtual router. If not, flow again proceeds to block 104 of FIG. 8B and node n does not forward the data packet. However, if node n belongs to the last virtual router, node n potentially will forward the data packet, and flow continues on to block 92 of FIG. 8B.

Referring now to block 92 of FIG. 8B, node n delays forwarding of the data packet and monitors for forwarding of the packet by another node to avoid a situation in which the wireless network is flooded with forwarded data packets. In some embodiments, node n sets its delay as rand(n→seed)×t seconds, where the function rand(n→seed) computes a random number using a predetermined seed at node n, and t is a time constant (e.g., 70 ms). With reference next to decision block 94, if node n does not detect forwarding of the data packet, flow continues to decision block 96 at which it is determined whether the time interval for the delay has ended. If not, flow returns to block 92 and monitoring continues. If, however, forwarding has not been detected by the end of the time interval, flow continues to block 102 at which node n forwards (i.e., broadcasts) the packet. At that point, flow for node n in relation to that data packet is terminated.

Referring again to decision block 94, if node n detects forwarding of the packet, flow can continue to block 98 at which it is determined whether nodes m and n form part of the last virtual router. This can be determined by node n by comparing the DTD of node m (i.e., the virtual hop count from the packet header) and its own DTD to determine if both nodes are part of the last virtual router. If either of the DTDs do not equal 1, one or both of nodes m and n are not part of the last router, in which case flow continues to block 104 and node n does not forward the data packet. On the other hand, if both DTDs are equal to 1, both nodes m and n are part of the last virtual router and flow continues to decision block 100.

From decision block 100, flow depends upon whether an acknowledgement message is received from the destination node, which indicates successful arrival of the data packet at the destination node. If no such acknowledgement message is overheard by node n, this indicates that node m moved out of the transmission range of the destination node before the data packet was broadcast. In that case, node n forwards the data packet, as indicated in block 102, to assist in relaying the packet to its destination. It is noted that a similar technique can be employed in relation to other virtual routers of the communication route, if desired, to account for situations in which a mobile node moves outside of the virtual router before it forwards a data packet.

From the above, it can be appreciated that all of the mobile nodes within the area spanned by a virtual router are available for forwarding data. Therefore, should one of the mobile nodes move and become unavailable for forwarding data along the established route, one of the other mobile nodes of the virtual router that is still geographically proximate can forward the data on the previous node's behalf. Operating in that manner, movement of mobile nodes within a network is less likely to cause a break in an established communication path.

If all the mobile nodes move away from a virtual router, a broken link in the virtual route can occur. To reduce the occurrence of broken links, the destination node can periodically recruit new nodes to form replacement virtual routers by sending out an unsolicited route reply, called route update, to the source node. In some embodiments, a route update message packet contains the ID of the destination node, the ID of the source node, the list of nodes traversed by the latest data packet (i.e., the nodes listed in a traversed nodes field of the data packet) received by the destination from the source node, and the ID of the route. The nodes listed in the route update message packet relay the route update to the source node. Those nodes establish a new virtual router identified by the corresponding node IDs as in the case of processing a route reply message packet, and define a new route between the source and destination nodes. With this strategy, a communication session rarely experiences a virtual link break. Should such a break occur, the source node can initiate route request to establish a new route. Notably, if route updates are performed relatively frequently, the actions described in relation to blocks 88, 89, and 90 of FIG. 8A may be unnecessary.

In rare cases, a virtual link break can occur before the next route update. When this happens, route recovery can be performed as follows. Periodically, the source node expects a route update packet from the destination node. The source node detects a virtual link break if the next route update is late by a predetermined threshold. In this situation, the source node issues a route request (as described previously) and waits for the route reply (as described previously) for information on the new communication route to the destination. The route reply message packet contains the packet ID of the last data packet received by the destination node. Once the route recovery is accomplished, the source node resumes the data transmission starting from the data packet succeeding the last data packet received by the destination node. These data packets are forwarded along by the new virtual routers. In such a case, the route recovery procedure is a source-initiated technique. In alternative embodiments, a destination-initiated scheme can be used in which the route recovery procedure is initiated by the destination node when it does not receive an anticipated data packet by a predetermined maximum delay.

Besides MANET, virtual routers can be applied to design less expensive wireless mesh networks. A mesh network comprises radio transmitting/receiving nodes placed over a geographical area to facilitate wireless communications. To deliver data from one part of the mesh to another, the network determines the best multi-hop route between them. In that environment, virtual routers can be used for high traffic parts of the network to save the cost of transmitting/receiving nodes. Less hardware also results in a network that is less expensive to operate and maintain (i.e., lower total cost of ownership). Such an environment not only allows neighbors to connect their home networks together, but also enables mobile users to participate in the mesh network. In addition, home users can share faster Internet access more cost effectively through common Internet gateways, and intra-network communications are more efficient by negating the need to route communications through a service provider and the Internet.

As can be appreciated from the above discussion, the presently described systems and methods fix virtual routers to a physical location for an extended period of time. With such virtual routers, available mobile devices may take turns in helping forward data packets between a source node and a destination node. Since the virtual routers do not move, the communication links are significantly more robust than communication links of previous networks. Therefore, implementation of virtual routers enables large-scale deployment of MANETs that are more effective for a wider range of mobile applications that are not currently possible (e.g., video communications over a large area with high mobility nodes).

I claim:

1. A method for forming a communication route between a source node and a destination node, the communication route comprising multiple virtual routers, the method comprising:
   the source node broadcasting a route request message for the destination node;
   relay nodes positioned between the source node and the destination node receiving the route request message and relaying the route request message to the destination node;
   the destination node receiving the route request message relayed by the relay nodes and broadcasting a route reply message for the source node;
   the relay nodes receiving the route reply message and relaying the route reply message to the source node; and
   each mobile node within a transmission range of a nearby relay node that overhears the route reply message relayed by the nearby relay node joining the nearby relay node to form a virtual router that extends across the transmission range of the nearby relay node, the virtual router comprising a logical router that is associated with a particular geographic region wherein each of the mobile nodes of the virtual router within that geographical region that receives data packets communicated between the source node and the destination node available to forward the data packets on behalf of the virtual router, wherein whether or not a mobile node of a virtual router forwards the data packets on behalf of the virtual router depends at least in part upon the mobile node's distance from the destination node.

2. The method of claim 1, wherein the each mobile node of the virtual router determines its own distance from the destination node by identifying a virtual hop count value contained in the overheard route reply message.

3. The method of claim 2, wherein the mobile node determining its distance from the destination node further comprises the mobile node setting its distance from the destination node to be the virtual hop count value.

4. The method of claim 2, wherein the mobile node determining its distance from the destination node further comprises the mobile node comparing the virtual hop count value to a virtual hop count value of a previously overheard route reply message, and setting its distance from the destination node to be the lower of the virtual hop count values.

5. A method for delivering messages between a source node and a destination node in a mobile network that comprises multiple virtual routers, the method comprising:

creating a communication route between the source node and the destination node comprised of multiple virtual routers, each virtual router being fixed to a particular geographical area and including a plurality of mobile nodes, each of the mobile nodes being configured to determine its own distance from the destination node and being configured to forward a data packet on behalf of its associated virtual router based at least in part upon its distance from the destination node; and each mobile node of a virtual router upon receiving a data packet sent over the communication route determining whether or not it should forward the data packet along the communication route on behalf of its virtual router based in part upon the distance from the destination node.

6. The method of claim 5, wherein creating a communication route comprises:

the source node broadcasting a route request message for the destination node;

relay nodes positioned between the source node and the destination node receiving the route request message and relaying the route request message to the destination node;

the destination node receiving the route request message relayed by the relay nodes and broadcasting a route reply message for the source node;

the relay nodes receiving the route reply message and relaying the route reply message to the source node; and each mobile node within a transmission range of a nearby relay node that overhears the route reply message relayed by the nearby relay node joining the nearby relay node to form a virtual router that extends across the transmission range of the nearby relay node.

7. The method of claim 5, wherein the mobile node determining whether or not it should forward the data packet along the communication route comprises the mobile node determining whether the mobile node is the destination node.

8. The method of claim 5, wherein the mobile node determining whether or not it should forward the data packet along the communication route comprises the mobile node determining whether the mobile node is in the communication route.

9. The method of claim 5, wherein the mobile node determining whether or not it should forward the data packet along the communication route comprises the mobile node determining whether or not another device that sent the data packet to the mobile belongs to a virtual router centered on the destination node.

10. The method of claim 9, wherein the mobile node determining whether or not it should forward the data packet along the communication route further comprises the mobile node determining whether the mobile node is downstream of the other device that sent the data packet.

11. The method of claim 10, further comprising, if the mobile node is downstream of the other device that sent the data packet, the mobile node forwarding the data packet if the mobile node does not detect forwarding of the data packet by another mobile node.

12. The method of claim 9, wherein the mobile node determining whether or not it should forward the data packet along the communication route further comprises the mobile node determining whether the mobile node belongs to the virtual router centered on the destination node.

13. The method of claim 12, further comprising, if the mobile node belongs to the virtual router centered on the destination node, the mobile node forwarding the data packet if the mobile node does not detect forwarding of the data packet by another mobile node.

14. The method of claim 5, wherein the mobile node determining whether or not it should forward the data packet along the communication route comprises the mobile node determining whether both the mobile node and another device that sent the data packet are part of a virtual router centered on the destination node if forwarding of the data packet is detected.

15. The method of claim 14, wherein the mobile node determining whether or not it should forward the data packet along the communication route further comprises the mobile node determining if an acknowledgement message has been received from the destination node if the mobile node and the other device that sent the data packet are part of the virtual router centered on the destination node.

16. A mobile network comprising:

a source node;

a destination node; and a communication route that extends between the source node and the destination node, the communication route comprising one or more virtual routers, each virtual router being a logical router fixed to a particular geographical area and including a plurality of mobile nodes, each of the mobile nodes being available to alternatively forward data packets along the communication route on behalf of its associated virtual router, wherein each mobile node is configured to (i) join a virtual router upon the mobile node overhearing a reply request message of a destination node relayed by a nearby relay node, (ii) determine a distance of the mobile node to the destination node, and (iii) determine whether or not the mobile node should forward a received data packet along the communication route based in part upon the distance of the mobile node to the destination node.

17. The network of claim 16, wherein the mobile nodes are further configured to identify a virtual hop count value contained in the overheard route reply message and set the virtual hop count value as the distance of the mobile node to the destination node.

18. The network of claim 16, wherein the mobile nodes are further configured to determine whether the mobile node is the in the communication route.

19. The network of claim 16, wherein the mobile nodes are further configured to determine whether or not another device that sent the data packet to the mobile node belongs to a virtual router centered on the destination node.

20. The network of claim 19, wherein the mobile nodes are further configured to determine whether the mobile node is downstream of the other device that sent the data packet.

21. The network of claim 20, wherein the mobile nodes are further configured to, if the mobile node is downstream of the other device that sent the data packet, forward the data packet if the mobile node does not detect forwarding of the data packet by another mobile node.

22. The method of claim 19, wherein the mobile nodes are further configured to determine whether the mobile node belongs to the virtual router centered on the destination node.

23. The method of claim 22, wherein the mobile nodes are further configured to, if the mobile node belongs to the virtual router centered on the destination node, forward the data packet if the mobile node does not detect forwarding of the data packet by another mobile node.

24. The network of claim 16, wherein the mobile nodes are further configured to, if forwarding of the data packet is detected, determine whether both the mobile node and another device that sent the data packet are part of a virtual router centered on the destination node.

25. The network of claim 16, wherein the mobile nodes are further configured to, if the mobile node and the other device that sent the data packet are part of the virtual router centered on the destination node, determine if an acknowledgement message has been received from the destination node.

26. A mobile node comprising:
a processing device;
a wireless communication device; and
memory that stores a wireless communications manager that controls the mobile node's participation in a communication route, the wireless communications manager being configured to (i) join a virtual router of the network upon the mobile node overhearing a reply request message of a destination node relayed by a nearby relay node, the virtual router comprising a logical router that is associated with a particular geographic region and includes multiple mobile nodes, (ii) determine a distance of the mobile node to the destination node, and (iii) determine whether or not the mobile node should forward a received data packet along the communication route on behalf of its virtual router based in part upon the distance of the mobile node to the destination node.

* * * * *